![United States Patent Office]

3,271,324
Patented Sept. 6, 1966

3,271,324
CATALYST COMPOSITION CONSISTING OF COPPER OXIDE-IRON OXIDE ON ALUMINA
Ruth E. Stephens, Detroit, Daniel A. Hirschler, Jr., Birmingham, and Frances W. Lamb, Detroit, Mich., assignors to Ethyl Corporation, New York, N.Y., a corporation of Virginia
No Drawing. Filed June 1, 1962, Ser. No. 199,232
The portion of the term of the patent subsequent to Dec. 27, 1982, has been disclaimed
1 Claim. (Cl. 252—466)

This application is a continuation-in-part of our application Serial No. 99,380, filed March 30, 1961, now abandoned, which is a continuation-in-part of our application Serial No. 26,699, filed May 4, 1960, now abandoned.

This invention relates to copper catalysts. More particularly the invention relates to catalysts comprising copper oxide and optionally a promoter metal supported on a specific transitional alumina. The invention also relates to a method of substantially oxidizing the hydrocarbon and carbon monoxide constituents which are present in the exhaust gas of internal combustion engines.

In recent years extensive research has been devoted to the alleviation of air pollution in many metropolitan areas. Part of this effort has been directed to methods of reducing the unburned hydrocarbons and carbon monoxide emitted with the exhaust gas of internal combustion engines. Various catalytic converter systems have been proposed to accomplish this purpose. With such systems, the exhaust gases are passed through a catalytic bed wherein the noxious materials are converted to an inactive form.

In our earlier filed copending applications, Serial No. 26,699, filed May 4, 1960, and Serial No. 99,380, filed March 30, 1961, we have described and claimed catalysts which are especially effective for the oxidation of hydrocarbon and carbon monoxide constituents of exhaust gases. These catalysts consist of transitional activated alumina having a surface area of at least 75 square meters per gram and a specified silica content, on which is impregnated or with which is mixed, copper oxide such that the catalyst system contains between 0.5 and 25 percent copper in an oxide form. It was found that the inclusion of a small amount of another metal or metals frequently enhances the properties of those catalysts. As described therein, those catalysts promote the oxidation of a great percentage of hydrocarbon and carbon monoxide emitted with the exhaust gas stream. Moreover, those catalysts are extremely resistant to the many catalyst poisons found in the exhaust gas stream of current internal combustion engines.

Among the catalysts disclosed in the aforementioned applications, a certain group has outstanding catalytic properties. The purpose of the present application is to specifically claim this highly preferred embodiment. The catalysts of the present invention comprise copper oxide and, optionally, a promoter metal supported on a specific type of transitional alumina. When this particular type of transitional alumina is used, copper catalysts are obtained which are even more effective than copper catalysts wherein other seemingly similar transitional aluminas are used.

It is an object of this invention to provide novel oxidation catalysts. A further object is to provide catalysts which are particularly resistant to the potential catalyst poisons found in the exhaust gas stream of modern vehicles. A further object is to provide a method of oxidizing substantial amounts of the unburned hydrocarbons and carbon monoxide in the exhaust gas stream of modern internal combustion engines.

The objects of the present invention are accomplished by providing novel catalysts particularly adapted for conversion of exhaust gas components, said catalysts comprising a transitional activated alumina having a surface area of at least 75 square meters per gram, on which has been impregnated or with which has been mixed from about 0.5 to 25 weight percent copper in an oxide form and, optionally, from about 0.01 to 10 percent of a promoter metal, said transitional alumina comprising a mixture of eta alumina and alpha alumina monohydrate and, optionally, one member selected from the group consisting of gamma and a mixture of the chi and rho forms of transitional alumina. In other words, the eta and alpha monohydrate aluminas are essential constituents of the carriers of this invention. Once this requirement has been satisfied, the carrier may additionally contain either gamma alumina or a mixture of chi and rho forms of transitional alumina.

The catalysts contemplated by this invention contain from 0.5 to 25 percent copper in an oxide form and, optionally, from 0.01 to 10 percent of a promoter metal. In many applications an optimum concentration is from 4 to 15 percent copper. We have also found that when using a promoter metal, in most cases, it is preferable to use at least 0.5 percent of the promtor metal, based on the weight of the catalysts system. However, with some metals such as platinum, palladium, etc. amounts as low as 0.01 percent of the metal may be used. With these latter metals, preferred concentrations are from about 0.03 to one percent. Using other promoter metals, preferred concentrations are from about 3 to 8 percent of the promotor metal. With a freshly prepared catalyst, the copper is present in one of its oxidized states. The promoter metal may be present in the metallic state or as an oxide. When in actual operation, the catalyst system is very complex, but the metals no doubt fluctuate through various oxidation states depending upon temperature and the nature of the environment.

We have found the above combination of transitional activated alumina and copper oxide to be specific. In other words, our catalysts are superior to those prepared using transitional alumina but using other metals in place of copper, and superior to copper catalysts wherein conventional catalyst carriers or other transitional alumina carriers are used in place of the specified transitional alumina.

By the use of our invention, substantially all of the carbon monoxide is converted to carbon dioxide and a great percentage of the unburned hydrocarbons are completely oxidized to carbon dioxide and water. Further, the catalysts of this invention are active over a wide temperature range and under a variety of engine operating conditions. Other important aspects of our catalysts are: Excellent thermal stability at extremely high temperatures, they do not catalyze the oxidation of nitrogen, and they function substantially independently of sulfur content of the gasoline.

As disclosed in the aforementioned copending applications, a variety of transitional aluminas can be used to obtain excellent copper catalysts. As described therein, transitional aluminas are metastable forms which, in general, are produced by heating of alpha or beta alumina trihydrates or of alpha alumina monohydrate. As each of these starting materials, or any mixture thereof, is heated, phase changes take place. A number of intermediate or transitional alumina phases are formed. These are characterized by being only partially or poorly crystalline. They are partly amorphous and partly crystalline. Formation of these phase is reversible; i.e., on rehydration they can be converted back to the starting materials. On prolonged heating, particularly at very high temperatures such as 1150° C., they are converted to the so-called "alpha alumina" which is a stable, refractory type of alumina.

In the overall transition between the alumina trihydrates and alpha alumina, several different transitional aluminas are prepared, either simultaneously or concurrently. Some of these transitional phases are convertible to others upon appropriate heating or cooling. According to the nomenclature used in the pamphlet "Alumina Properties," Russell et al., published by the Aluminum Company of America, Pittsburgh, Pennsylvania, 1956, the names assigned to the various transitional aluminas are gamma, delta, eta, theta, kappa, chi and rho. In addition, the alpha monohydrate itself is in a sense a transitional alumina, since it is a product reversibly obtained on heating of either alpha or beta alumina trihydrate under suitable conditions of temperature and time. In addition to the transitional forms described above, there is a truly amorphous alumina which is characterized by having no definite X-ray diffraction pattern. However, some workers have assigned a characteristic broad X-ray line at 4.5 A. to amorphous alumina. In one sense amorphous alumina can also be considered transitional for upon heating, its structure can be converted to other forms of transitional alumina.

It appears not possible to describe each transitional alumina in terms of its specific physical properties other than those mentioned above. Many can be characterized by their X-ray diffraction pattern. Several of these are reproduced on page 28 of the pamphlet referred to above.

We have found that the use of certain particular combinations of transitional aluminas results in superior copper catalysts. Such catalysts are more durable and efficient, and have a longer longevity than otherwise similar copper catalysts but using another form of transitional alumina. In other words, a particular type of transitional alumina is specific and is preferred over other forms of apparently closely related transitional aluminas.

The transitional aluminas used in the catalysts of this invention comprise a mixture of the eta and alpha monohydrate forms of transitional alumina and, optionally, a member selected from the group consisting of gamma and a mixture of chi and rho forms of transitional alumina. It is essential that the transitional alumina mixture contain from 10 to 90 percent eta and from 10 to 90 percent alpha monohydrate. The carriers, optionally, may further contain from zero to 65 percent gamma or from zero to 65 percent of a mixture comprising from 10 to 90 percent chi and from 10 to 90 percent rho forms of transitional alumina. Thus, the essential constituents of the carriers of this invention are eta and alpha monohydrate, and when this requirement is met, the carrier may additionally contain gamma alumina or alternatively, a mixture of chi and rho forms of transitional alumina.

A preferred transitional alumina carrier of this invention comprises a mixture of from about 15 to 85 percent eta and from about 15 to 85 percent alpha monohydrate, said mixture being substantially free of the chi and gamma transitional forms of alumina.

As previously pointed out, transitional aluminas are in various states of hydration and crystalline structure. At times, the specific phase is difficult to identify, and certain workers have used the prefix "pseudo" to indicate an identifiable but indistinct phase. Thus, a phase which appears to be alpha monohydrate but whose X-ray pattern does not exactly match that of the true alpha monohydrate may be referred to as pseudo alpha monohydrate, or pseudo bohmite. Similarly, the term pseudo gamma is used by some workers to refer to transitional aluminas which appear to have many of the characteristics of true gamma alumina but with some minor variations or indistinct properties. For the purpose of this invention, no distinction is made between the clearly established phase and the so-called pseudo phase, and both are acceptable as materials useable in the carriers of this invention.

It is not possible to ascribe definite procedures to preparation of the transitional aluminas of this invention. Conversion of the starting materials—alpha and beta alumina trihydrates and alpha alumina monohydrate—to one or more of the transitional aluminas of this invention, as well as conversion of one transitional alumina to another is a function of both time and temperature. Heating to a high temperature for a short time can result in a mixture of transitional aluminas having the same composition as is produced by heating the same starting mixture or ingredient to a lesser temperature for a longer time. Generally speaking, alpha alumina trihydrate is converted to the alpha monohydrate at about 140° C. in air or superheated steam and at about 100° C. in vacuum. Beta alumina trihydrate appears to be readily converted to the alpha monohydrate at about 120–160° C. Heating of the alpha trihydrate to about 140° C. for one hour results in some conversion to the chi transitional form. The chi form, in turn, goes over to some extent to the kappa transitional alumina when heated to 500° C. for one hour. Vacuum dehydration of alpha trihydrate yields the rho form of transitional alumina. This particular alumina has a single X-ray line at 1.40 A. It is also distinguished by its narrow pores and almost quantitative ability to rehydrate to beta trihydrate at room temperature. Heating of the alpha monohydrate for one hour at 250° C. gives some gamma, which on heating at 850° C. for the same length of time produces some theta transitional alumina with possible intermediate conversion to delta. Heating of the beta trihydrate to 140° C., in addition to producing some alpha monohydrate, also produces some of the eta activated form. This in turn goes over to theta on heating at 450° C.

The kappa and theta forms are converted to the alpha alumina, not useful in this invention, on heating to 1150° C. for one hour.

In general then, the transitional alumina used in this invention is prepared by heating a starting alumina selected from the class consisting of alpha alumina trihydrate, beta alumina trihydrate and alpha alumina monohydrate to a temperature of at least 100–150° C. for a period of time sufficient to permit substantial conversion to a transitional alumina of this invention, but insufficient to convert a substantial fraction of these transitional aluminas to other phases or irreversibly to the inactive alpha alumina. In general, prolonged heating above about 800° C. should be avoided. Our carriers may contain small amounts of either the starting material, transitional aluminas other than those of this invention, or alpha alumina, or a combination of the aforesaid.

The transitional alumina forms of this invention may be formed independently and physically mixed, or they may be prepared simultaneously. However, due to economic considerations, the latter technique is preferred.

In addition to the inherent nature of the transitional alumina itself, another essential property is that the alumina have a minimum surface area/mass ratio. The transitional aluminas which we use are those whose surface area/mass ratio is at least 75 square meters per gram (m.$^2$/g.). In order to function efficiently according to our invention, the transitional alumina must meet this criterion.

Another property that has an effect on the performance of our catalysts is silica content. In some cases we have found the presence of a small amount of silica stabilizes the copper catalyst and also results in harder, more durable catalysts.

Thus preferred catalysts of this invention utilize carriers comprising a specific transitional alumina as described above which is further characterized by having a surface area of 75 square meters per gram and a silica content of from 0.01 to about 5 percent.

Certain aluminas meeting the requisites of this invention are commercially available. Included among these are active aluminas available from the Kaiser Aluminum Company as the KA-101 series and KA-201. Analyses and physical properties of these transitional aluminas are:

CHEMICAL ANALYSIS, PERCENT

|  | KA-101 | KA-101-N | KA-201 |
|---|---|---|---|
| $Al_2O_3$ | 90+ | 90+ | 90+ |
| $Na_2O_3$ | 0.4 | 0.6 | 0.20 |
| $Fe_2O_3$ | 0.02 | 0.02 | 0.02 |
| $SiO_2$ | 0.02 | 0.02 | 0.02 |
| Loss on Ignition, 1,100° C | 4.2 | 4.5 | 6.5 |

PHYSICAL PROPERTIES

|  | KA-101 | KA-101-N | KA-201 |
|---|---|---|---|
| Surface area, $m.^2/g$ | 360 | 335 | 340 |
| Bulk density $lb./ft.^3$ | 43 | 45 | 47 |
| Pore volume ml./g | | 0.52 | 0.45 |
| Pore diameter, A | | 62.5 | 53.1 |
| Static sorption, percent [1] | 19.7 | 19.4 | 20.0 |
| Crushing strength, percent | 66 | 66 | 80 |

[1] At 60 percent relative humidity.

The phase compositions of the above aluminas are as follows: The principal constituents of KA-101 are the eta and alpha monohydrate forms of transitional alumina. This material does not contain the usual chi and gamma forms of transitional alumina. A second formulation in the KA-101 series, designated as KA-101-N, is composed of a major amount of the eta, chi, and rho forms of transitional alumina with a small amount of pseudo alpha monohydrate which is also referred to as pseudobohmite. Formulation KA-201 comprises mainly the so-called pseudo gamma form of transitional alumina and lesser amounts of eta and pseudobohmite forms of transitional alumina.

We may use either the spherical or granuler forms of transitional alumina as our carriers. The granular aluminas we use may be from about 2.5 to 8 mesh (Tyler standard screen scale sieves). However, we have found materials of from 4 to 6 mesh to be optimum for an exhaust gas application.

An important property of any catalyst is its resistance to attrition and abrasion. This is particularly true with an automobile exhaust application because of the continual agitation and physical shocks to which the catalyst bed is subjected. While the granular from the transitional alumina is an excellent material for this application, we have found that the ball form is particularly resistant to attrition and abrasion. An example of the ball form of transitional alumina is KA-101 described above. This material is prepared by the controlled calcination of beta trihydrate, and in its finished form is composed mainly of eta alumina and alpha monohydrate. The final product has low silica and titanium dioxide content, 0.02 and 0.002 respectively. Its high surface area and extreme resistance to abrasion make it admirably suited for an exhaust gas application. The material has a hard uniform surface, crushing strength of 66 percent, and excellent thermal stability properties. The sphericity of the active alumina balls eliminates or reduces to a minimum the chipping which is evident when using a bed consisting of a granular material. Moreover, the uniform sphericity reduces packing and channeling, resulting in lower pressure drop as compared to a granular catalyst bed. Active aluminas of from about 1/16 to 3/8 inch diameter or mixtures of alumina balls in this range are suitable for this application. However, we prefer to use those ranging in size from 1/8 to 1/4 inch. Thus, a preferred embodiment of this invention is a catalyst especially suited for exhaust gas conversion, said catalyst consisting of ball form transitional alumina of from 1/16 to 3/8 inch, preferably from 1/8 to 1/4 inch in diameter, said alumina having a surface area of at least 75 $m.^2/g.$ and being mixed or impregnated with from 0.5 to 25 percent copper in an oxide form.

We further prefer, under certain conditions of operation, to use in the same catalyst bed copper oxide impregnated on two or more geometric forms of transitional alumina. Some ball forms of alumina may have superior properties with respect to attrition, whereas some granular forms may be superior with respect to oxidation efficiency. By using both forms of alumina, the advantages of resistance to attrition and abrasion of the ball form and the superior oxidation efficiency of the granular form are combined. The different forms of aluminas may be mixed prior to catalyst preparation or jointly impregnated and decomposed to form the finished catalyst. Also, the two catalysts may be prepared independently and mixed after final preparation. The two forms of catalysts may be mixed randomly to form the bed or they may be stratified, horizontally or vertically. The front portion of the bed may be composed of one form and the rear portion of the other form and vice-versa. We prefer to have the front portion of the bed composed of a catalyst prepared by using a ball form of alumina and the rear part of the catalyst using the granular form of the alumina as the carrier. By this technique the pulsating and abrasive effect of the entering gas stream is eliminated or reduced to a minimum, being absorbed by the more resistant ball form and the overall efficiency of the bed is maintained at a high level by the more efficient granular form which composes the rear part of the bed. Thus, another preferred embodiment of this invention is a catalyst especially suited for exhaust gas conversion wherein the front 2 to 40 percent portion of the catalyst bed consists of a catalyst using as a carrier material the ball form of the transitional aluminas of this invention of from 1/16 to 3/8, preferably from 1/8 to 1/4 inch in diameter and the rear 60 to 98 percent portion of said catalyst bed consists of a catalyst prepared by using a granular transitional alumina of this invention of from 2.5 to 8, preferably from 4 to 6 mesh, both said ball form and granular form of transitional alumina having a surface area of at least 75 square meters per gram, both said transitional aluminas being impregnated with from 0.5 to 25 percent copper in an oxide form.

We have also found that under certain conditions, the inclusion of a small amount of another metal or metals may further enhance the properties of our catalysts. In some cases we prefer to use more than one metal as promoter metals. The additional metal or metals act as a "promoter"; that is, though in themselves they may have little activity, they impart better characteristics to the finished catalysts. Generally, promoters serve to improve the activity, stability, or selectivity for the reaction in question and oftentimes it is difficult to make a distinction as to their specific function. We have found that the inclusion of up to about 10 percent, based on the total weight of the catalyst-carrier system, of a promoter metal or metals may to a degree improve efficiency and life of the catalysts of this invention. The promoter metal in the finished catalyst is usually in an oxide form but in some cases; e.g. silver, it may exist as the free metal. Metals that may be used as promoters include sodium, lead, potassium, magnesium, calcium, strontium, barium, platinum, palladium, titanium, chromium, zirconium, iron, cobalt, nickel, manganese, zinc, cadmium, germanium, tin, silver, cesium, gallium, vanadium, scandium and the Lanthanide Series of Elements, including yttrium, lanthanum, cerium, praseodymium, neodymium, promethium, samarium, europium, gadolinium, terbium, dysprosium, holmium, erbium, thulium, ytterbium, and lutetium (see pages 891–893 of "Inorganic Chemistry" by Therald Moeller, John Wiley and Sons, Inc., New York, New York, (1952) and the like including metals from Groups I, II, III, IV, V, VI, VII and VIII of the Periodic Table of the Elements. These metals may be introduced before or during preparation of the catalysts as salts such as nitrate, acetate, carbonate and the like or in the form of oxides or hydroxides, or even as the finely divided metal itself. A less desirable method is to impregnate a finished copper oxide-alumina catalyst with a promoter metal in one or more of the above forms.

While a variety of metals may be used as promoters, we prefer to use one or more metals selected from the group consisting of the First Transition Series of the Periodic Table including elements of atomic numbers 21–28. Especially preferred among this group are manganese, iron, and cobalt.

We have found that the use of iron results in extremely durable and effective catalysts. Accordingly, a preferred catalyst of this invention comprises a transitional alumina as described above impregnated with from about 4 to 15 percent copper and from 3 to 8 percent iron, both metals being present in oxide forms.

The catalysts of this invention may be prepared in a variety of ways. They may be prepared by contacting the activated transitional alumina with a solution, not necessarily aqueous, of an organic or inorganic compound of copper, allowing sufficient time for impregnation, and then subjecting the mass to appropriate conversion treatment. The conversion consists of thermal treatment to remove free water from the system, to convert the copper to the oxide form, and to convert the promoter metal to its active form. A great variety of specific conversion techniques are well known to those skilled in the art. If it is desired to impregnate the alumina with both a catalytic agent and a promoter, the alumina can be contacted successively with a solution of each meal in either order, or with one solution containing both metals. The catalysts can be prepared from copper nitrates, carbonates, acetates, sulfates, hydroxides, lactates, formates, oxalates, propionates, benzoates and the like. The same general types of salts are useful for impregnating the substrate with a promoter metal or metals when a promoter is desired. True organo-copper compounds such as cyclopentadienyl copper triethylphosphine, bis ethylamino methylene acetone copper II, bis acetyl acetonate and the like can be used. Other methods of preparing mixtures of transitional aluminas and copper oxides can also be used. For example, the copper oxide may be incorporated into the transitional alumina during the conversion of the starting alumina to the transitional form.

A preferred method of making our catalyst constitutes starting with a copper salt or oxide and forming an ammoniacal solution whereby a deeply violet-colored copper ammonium complex is formed. The transitional alumina is then impregnated with the copper complex and gradually heated. The copper complex is decomposed to yield the active copper oxide form. We have found that the catalysts prepared by this method are superior to catalysts prepared by more conventional methods. Among other advantages, this method allows greater amounts of copper to be put in solution per unit volume.

A particularly convenient and desirable method of producing our catalysts, which constitutes our preferred method, is starting with basic copper carbonate, usually either the malachite or azurite forms or a mixture of both. When this material is mixed with a solution of ammonium carbonate and ammonia, a deeply violet-colored copper ammonium carbonate complex is formed. The transition alumina can then be impregnated with the copper complex, which is then easily decomposed to copper oxide by heating. We have found that catalysts produced in this manner are superior to those made by other methods of preparation. Such catalysts have the advantages of being more resistant to attrition and of having better stability and longer life. Moreover, problems such as solubility of starting materials, corrosion to equipment during preparation, and poisonous fumes encountered with some other methods of preparation are eliminated. Our preferred method, besides producing superior catalysts, has the advantages of starting with relatively inexpensive materials, being able to produce a highly concentrated solution of the copper complex, and the ease of decomposing the complex to the active copper oxide form.

The following examples are not meant to limit the methods of making our catalysts, but to show some of our preferred methods.

*Example I*

A transitional alumina comprising a mixture of about 15 percent eta and 85 percent alpha monohydrate forms of transitional alumina is used as the carrier for the catalyst of this example. Basic copper carbonate, $$CuCO_3 \cdot Cu(OH)_2$$

is mixed with a solution of ammonia and ammonium carbonate, a deeply violet-colored mixture being formed. The mixture contains a solution of copper ammonium carbonate 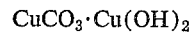. The transitional alumina is immersed in a volume of this solution barely sufficient to cover its bulk. The material is then allowed to stand for a sufficient time to be thoroughly impregnated with the solution. Then the temperature of the mixture is gradually raised to drive-off water, carbon dioxide and ammonia. During the heating, the copper ammonium carbonate decomposes to an oxide or mixture of oxides of copper. The finished catalyst is the specific transitional alumina impregnated with oxides of copper. In this example the finished catalyst contained 0.5 percent copper. This concentration is determined by the relative amounts of alumina and basic copper carbonate used in the preparation.

*Example II*

The procedure of Example I is followed but the amount of basic copper carbonate used is such that the finished catalyst is composed of 25 percent copper in an oxide form. The transitional alumina used in this example is composed of a mixture comprising 40 percent eta, 25 percent chi, 20 percent rho and 15 percent pseudo monohydrate, also referred to as pseudobohmite.

*Example III*

The transitional alumina of Example I is immersed in a solution of copper acetate and allowed to stand. The temperature of the solution is then gradually raised to drive-off all the free water. At this point the alumina pellets are coated with copper acetate and have a slightly moist texture. The mixture is then spread on a surface which is heated to above the decomposition temperature of copper acetate. A draft of air or inert gas is then passed over the material. During the heating the copper acetate decomposes to an oxide or mixture of oxides of copper. In this example the finished catalyst contains 5 percent copper in an oxide form.

*Example IV*

A transitional alumina composed of 10 percent alpha alumina monohydrate, 25 percent eta and 65 percent gamma transitional alumina is mixed with a solution of copper nitrate and ferric nitrate. The procedure of Example I is followed. The finished catalyst is the specific transitional alumina impregnated with oxides of copper and iron, comprising by weight 12 percent copper and 6 percent iron.

*Example V*

The procedure of Example I is repeated using a solution of basic copper carbonate, ammonia, ammonium carbonate and barium acetate such that the final catalyst material (transitional alumina impregnated with oxides of copper and barium) was 25 percent copper and 3 percent barium. The transitional alumina contains 30 percent eta, 10 percent alpha monohydrate, 30 percent chi and 30 percent rho transitional aluminas along with some alpha alumina monohydrate. Based on its dried weight, the alumina carrier contained 5 percent silica.

*Example VI*

Transitional alumina is mixed with a solution of copper acetate and manganese acetate and the solution is heated to dryness and the procedure of Example III followed. The finished catalyst is transitional alumina impregnated with oxides of copper and manganese, comprising 10 percent copper and 2 percent manganese. Principal components include 20 percent pseudo alpha alumina monohydrate (also known as pseudobohmite), 60 percent eta and 20 percent gamma forms of transitional alumina.

*Example VII*

KA-101 alumina is used as the carrier in this example. This transitional alumina has about 95.4 percent $Al_2O_3$, about 0.02 percent $SiO_2$, about 0.02 percent $F_2O_3$, about 0.002 percent $TiO_2$, and 0.40 percent $Na_2O$. On ignition it loses about 4.2 percent of its weight. It is a ball form of transitional alumina having a surface area of about 360 m.$^2$/g. Its bulk density is about 43 lb./ft.$^3$ and has a dynamic sorption of about 19.7 percent. Its crushing strength is 66 percent. It is prepared by the carefully controlled calcination of beta trihydrate and its principal constituents are eta alumina and alpha monohydrate. One-sixteenth inch diameter balls are immersed in a solution of copper acetate and the procedure of Example III is followed. In this example the finished catalyst is 1/16 inch diameter ball form of transitional alumina impregnated with 6 percent copper in an oxide form.

*Example VIII*

The procedure of Example X is followed but the carrier material for this catalyst is KA-101 ball form of transitional alumina having a diameter of approximately 3/8 inch. The amount of copper acetate solution used in this example was such that the finished catalyst contained 12 percent by weight of copper in an oxide form.

*Example IX*

In this example the catalyst bed is composed of copper oxide impregnated on both granular and ball forms of alumina. The front 2 percent portion of the catalyst bed is composed of the catalyst of Example VII and the rear 98 percent portion of the bed is composed of a granular catalyst having the composition of the catalyst of Example III.

*Example X*

In this example the catalyst bed is composed of copper oxide impregnated on both granular and ball forms of alumina. The front 40 percent portion of the bed is composed of the catalyst of Example VIII and the rear 60 percent of the bed is composed of a granular catalyst having the composition of the catalyst of Example I.

*Example XI*

KA-101 alumina, passing through a five-mesh (Tyler standard screen scales sieve) and retained by an eight-mesh, is immersed in a solution of ferric nitrate and copper nitrate. The mixture is allowed to stand so that the alumina is thoroughly impregnated with the nitrate solution. The temperature of the solution is then gradually raised to evaporate all the free water. The impregnated alumina is then spread on a surface which is heated up to about 500° C. in the presence of a draft of air. During the heating, the copper nitrate and ferric nitrate decompose to form oxides of the respective metals. In this example, based on metallic weight, the finished catalyst contains 8 percent copper and 5 percent iron in oxide forms.

*Example XII*

A solution of copper nitrate and a mixture of rare earth nitrates is prepared. The rare earth mixture is derived from the naturally occurring monazite ore. In an oxide form, the approximate composition of the mixture is as follows:

| | Percent |
|---|---|
| Lanthanum oxide ($La_2O_3$) | 24 |
| Cerium oxide ($CeO_2$) | 48 |
| Praseodymium oxide ($Pr_6O_{11}$) | 5 |
| Neodymium oxide ($Nd_2O_3$) | 17 |
| Samarium oxide ($Sm_2O_3$) | 3 |
| Gadolinium oxide ($Gd_2O_3$) | 2 |
| Yttrium oxide ($Y_2O_3$) | 0.2 |
| Other rare earth oxides | 0.8 |

The nitrate salts of this mixture are commercially available from Lindsay Chemical Division of American Potash and Chemical Corporation. Five to eight mesh KA-101 transitional alumina is thoroughly impregnated with the nitrate solution, and the mixture is heated so as to evaporate all the free water. The impregnated alumina is then spread on a surface which is heated to about 550° C. During the heating, the copper nitrate and rare earth nitrates decompose to their various oxide forms. The finished catalyst, KA-101 alumina impregnated with oxides of copper and oxides of the enumerated rare earths, contains 14 percent copper and a total of 4 percent rare earths.

*Example XIII*

The procedure of Example XII is followed but the amounts of starting materials are such that the finished catalyst contains 8 percent copper and 7 percent rare earth metals including lanthanum, cerium, praseodymium, niobium, samarium, gadolinium, and yttrium, all in oxide forms.

*Example XIV*

Pre-dried six to eight mesh KA-101 alumina is immersed in a solution of cerium nitrate and copper nitrate. After soaking and decanting, the impregnated alumina is heated to about 600° C. for one-half hour. During the heating, the copper nitrate and cerium nitrate are decomposed to oxide forms. The finished catalyst, KA-101 alumina impregnated with oxides of copper and cerium, contains 8 percent copper and 6 percent cerium.

*Example XV*

Five to eight mesh KA-101 alumina is immersed in a solution of lanthanum nitrate and copper nitrate. The material is allowed to stand so as to be thoroughly impregnated with the nitrate solution. After decanting, the moist alumina spheres are heated to about 615° C. for about one-half hour. The finished catalyst, KA-101 alumina impregnated with oxides of lanthanum and copper, contains 15 percent copper and 5 percent lanthanum.

*Example XVI*

A solution of copper nitrate, cerium nitrate, lanthanum nitrate and neodymium nitrate is prepared. Five to eight mesh KA-101 alumina is immersed in the solution and allowed to stand so as to effect thorough impregnation. The excess water is drained away and the remaining material is heated to about 650° C. The finished catalyst contains 8 percent copper, 3 percent cerium, 4 percent lanthanum, and 4 percent neodymium.

*Example XVII*

Basic copper carbonate, $CuCO_3 \cdot Cu(OH)_2$, is mixed with a solution of ammonia and ammonium carbonate, a deeply violet-colored mixture being formed. Cobalt carbonate is dissolved in the solution. The resulting solution is mixed with a solution of ammonium metavanadate and oxalic acid. KA-101 alumina is immersed in a volume of this solution so as to cover its bulk. After a sufficient time to allow thorough impregnation, the mixture is gradually heated to drive off water, carbon dioxide, and ammonia. Heating is continued up to a temperature of about 550° C. During the heating, the copper, cobalt and vanadium salts decompose to oxide forms. The finished catalyst is KA–101 alumina impregnated with oxides of copper, cobalt, and vanadium. In this example, the finished catalyst contained 8 percent copper, 4 percent cobalt and 0.5 percent vanadium.

*Example XVIII*

The procedure of Example XVII is followed with the exception that the ammonium metavanadate-oxalic acid solution is omitted. After decomposition, the finished catalyst contains 4 percent copper and 1.5 percent cobalt.

*Example XIX*

A solution of copper nitrate, manganese nitrate, and ferric nitrate is prepared. Six to eight mesh KA–101 transitional alumina is immersed in the solution. After thorough impregnation and removal of the free water, the impregnated alumina is heated to about 600° C. During the heating the copper, manganese, and iron nitrates decompose to yield oxides of copper, manganese and iron. The finished catalyst is composed of a major portion of transitional alumina impregnated with 9 percent copper, 4 percent iron, and 4 percent manganese, all in oxide forms.

*Example XX*

The procedure of Example XVIII is followed but the quantity of starting materials is such that the final catalyst is composed of 9 percent copper and 6 percent cobalt, both in oxide forms.

*Example XXI*

A solution containing cupric carbonate, ammonium carbonate, ammonia and palladium nitrate was prepared. KA–101 transitional alumina was immersed therein and the solution heated to dryness. The resulting catalyst composite was then heated to 600° C. for one hour. The finished catalyst contained about 15 percent copper in an oxide form and about 0.1 percent palladium.

*Example XXII*

The procedure of Example XXI is followed but the carrier material of Example VI is used in place of the KA–101 material. In this example the amount of cupric carbonate and palladium nitrate was such that the finished catalyst contained about 0.01 percent palladium and 7 percent copper.

*Example XXIII*

The carrier material used in Example II is immersed in a solution of cupric nitrate and palladium nitrate. The solution is heated to dryness and the catalyst composition is then heated to 600° C. for about 45 minutes. The finished catalyst contained about 5 percent copper in an oxide form and about 1.0 percent palladium.

The outstanding effectiveness of our catalysts in an actual exhaust gas application is demonstrated by the following test: A modern vehicle with a V–8, 332 cu. in. engine was equipped with a muffler having provisions to retain a catalytic bed. Exhaust gases, together with secondary air, were passed through the catalytic bed. The muffler contained approximately 19.9 pounds of a preferred catalyst of this invention comprising oxides of copper and iron impregnated on a transitional alumina carrier of this invention. The vehicle was operated on a commercially available gasoline containing 3 ml. of lead per gallon as tetraethyllead, 0.07 weight percent sulfur and 0.3 theories of phosphorus as a mixture of dimethyl tolyl phosphate, dimethyl xylyl phosphate, methyl ditolyl phosphate and methyl dixylyl phosphate. One theory of a phosphorus compound is defined as the amount theoretically required to convert all the lead present to lead orthophosphate. The exhaust products from this fuel were passed through the catalytic bed and the ability of the catalyst to promote the oxidation of the hydrocarbon and carbon monoxide constituents was determined periodically.

The vehicle was used in general transportation including city and urban driving conditions. Periodic chassis-dynamometer observations were made of the catalyst efficiency in converting the undesirable products. Carbon monoxide and unburned hydrocarbon constituents of the exhaust gas stream were measured both prior to and after passage of the exhaust gas through the catalytic bed. Measurements were obtained under steady state cruising conditions of 60 miles per hour. Catalyst conversion efficiencies during the test were as follows:

TABLE I.—CONVERSION EFFICIENCIES

| Miles | Conversion, Percent | |
| --- | --- | --- |
| | Hydrocarbons | CO |
| Start of test | 75 | 99 |
| 2,500 | 61 | 86 |
| 4,600 | 65 | 90 |
| 6,900 | 45 | 90 |
| 9,100 | 52 | 86 |
| 11,300 | 53 | 76 |

The above data demonstrate the remarkable efficiencies of our catalyst. After the more than 11,000 miles of actual operation, the catalyst was still oxidizing over 50 percent of the unburned hydrocarbons and more than 75 percent of the carbon monoxide. Other catalysts of this invention give similar results.

Another property of the catalysts of this invention which is equally important as the oxidation efficiency is the physical durability of the catalyst. We have carried out many similar vehicle tests with other catalysts which have failed because of a lack of physical durability. We discovered that after being in use for a relatively short period of time, the catalysts tend to soften and become subject to chipping, flaking and powdering. Thus, a portion of the catalyst is carried along with the exhaust stream and discharged through the tailpipe as a powder. In this manner not only is the quantity of the catalyst bed reduced, but voids and channels are formed in the bed allowing the exhaust gas to pass therethrough with only a minimum contact with the catalyst. This results in a marked decline in catalyst efficiency. In this manner the efficiency of such catalysts were markedly reduced and in some cases, the catalysts were rendered totally inoperative in a relatively short period of time. However, the catalysts of this invention provide a solution to this problem. Copper catalysts impregnated on transitional alumina carriers of this invention are uniquely resistant to the above-described mode of failing. The catalysts are extremely hard and durable, and unlike other similar catalysts do not soften to an objectionable degree as they are used in an actual vehicle application.

An important feature of the catalysts of this invention is their excellent thermal stability properties. The catalyst bed temperature, under normal engine operation, may vary from 400 to 1700° F. Under extreme conditions of severe acceleration and deceleration, bed temperatures as high as at least 1750° F. have been observed. Using catalysts of this invention, catalyst beds have been operated at temperatures at least this high without substantially affecting catalytic activity. The property of heat stability is very important because it obviates the necessity of installing a mechanical system to have the exhaust gas by-pass the catalysts bed in case of extremely high temperatures. Such a by-pass system would be required if the catalyst were susceptible to damage at high temperatures. Good thermal stability is also desirable in that it allows the reaction to be carried out at higher temperatures wherein higher efficiencies may be attained. Furthermore, this property become important when considering the design of a commercial vehicle exhaust system incorporating an oxidation catalyst. The additional heat from the oxidation process would naturally tend to overheat the passenger compartment. This problem could be solved by insulating the catalyst bed and exhaust system. Of course, this would be possible only if the catalyst could tolerate the higher temperatures due to the insulation.

Still another important feature of the catalysts of this invention is their ability to catalyze reactions at extremely low temperatures. Since catalyst activity generally increases with temperature, in many applications it can be optimized by the simple expediency of increasing reaction temperatures. However, in exhaust gas conversion, temperatures cannot readily be controlled and a rather anomalous requisite of high activity at both low and high temperatures is imposed. The catalysts of this invention are active at a temperature as low as 350° F.; i.e., temperatures below that of the exhaust gas stream. However, catalyst activity is markedly improved at temperatures of 400° F. and above. Activities at lower temperatures may be obtained when the catalyst is promoted with a second metal. Of course, as the oxidation starts, the heat of reaction serves to raise bed temperatures to a much higher level.

Another feature of the catalysts of this invention is their ability to catalyze the oxidation of hydrocarbons and carbon monoxide without the concomitant oxidation of nitrogen. This is an important consideration. Oxides of nitrogen and their subsequent reaction products readily contribute to the formation of photochemical smog and are eye and respiratory irritants.

Still another advantage of our catalysts is that they are particularly resistant to poisoning by sulfur compounds commonly found in gasolines. This is an important consideration for current commercial gasolines may contain up to 0.10 percent surfur, and it would entail a significant expenditure to remove such compounds.

Our catalysts may be easily incorporated into the exhaust system of current vehicles. The catalyst is simply put into a suitable container with openings to receive and discharge the exhaust gases. To firmly retain the catalyst material, the receiving and discharge openings are covered with wire screening. The container may have internal baffling to allow greatest contact between catalyst and exhaust gas, and/or to use the hot reaction gases to heat the incoming exhaust gases. The container may actually replace the vehicle muffler, or it may be incorporated into the conventional exhaust system of current vehicles. The catalyst bed may also be located in the exhaust manifold or in the tailpipe of the exhaust system.

To aid the oxidation, secondary air may or may not be introduced into the system. To obtain maximum efficiency, we have found it preferable to introduce secondary air into the system. This is accomplished by the use of a variable speed blower, so that the amount of secondary air varies with operating conditions. The secondary air supply may also be introduced as a natural flow through the use of an appropriate air scoop or the like.

Our catalysts can be used to convert the exhaust gas of any gasoline. The gasolines can be of the aliphatic, aromatic and olefinic type including both straight run and catalytically produced gasolines and any and all mixtures thereof. The gasolines can contain the usual additives including organolead and other antiknock agents, such as tetraethyllead, tetraphenyllead, tetramethyllead, mixtures of alkylleads, such as tetraethyllead-tetramethyllead mixtures, ferrocene, methylcyclopentadienyl manganese tricarbonyl, cyclopentadienyl nickel nitrosyl, scavengers, antioxidants such as aromatic amines and diamines, 2,6-dialkyl and 2,4,6-trialkyl phenols, dyes, deposit modifiers, including trimethyl phosphate, dimethylphenyl phosphate and the like.

In addition to use in spark ignition internal combustion engines, the present catalyst may also be used to reduce or eliminate unburned hydrocarbons and carbon monoxide from the exhaust products of combustion processes in general. This includes the compression ignition engine, oil and coal furnaces, residual fuel burners, etc.

We claim:

A catalyst composition especially adapted to substantially oxidize the unburned hydrocarbons and carbon monoxide constituents of the exhaust gas of internal combustion engines, said composition consisting essentially of a major proportion of a transitional alumina and from 0.5 to about 25 percent by weight of copper oxide and from 0.5 to about 10 percent by weight iron oxide.

References Cited by the Examiner

UNITED STATES PATENTS

| | | | |
|---|---|---|---|
| 2,071,119 | 2/1937 | Harger | 23—2.2 X |
| 2,118,001 | 5/1938 | Andrews et al. | 252—463 X |
| 2,407,373 | 9/1946 | Kearby | 252—474 X |
| 2,426,829 | 9/1947 | Kearby | 252—474 X |
| 2,492,986 | 1/1950 | Hach | 252—466 X |
| 2,511,288 | 6/1950 | Morrell et al. | 23—4 X |
| 2,559,457 | 7/1951 | Montgomery et al. | 252—466 X |
| 2,725,400 | 11/1955 | Mecorney et al. | 225—476 X |
| 2,912,300 | 11/1959 | Cannon et al. | 23—2.2 |
| 3,024,593 | 3/1962 | Houdry | 23—2.2 X |
| 3,053,760 | 9/1962 | Henke et al. | 252—465 X |
| 3,064,062 | 11/1962 | Lorz et al. | 252—465 X |
| 3,076,858 | 2/1963 | Frevel et al. | 252—474 X |

OTHER REFERENCES

Russell et al.: "Alumina Properties," Technical Paper No. 10 (revised), Aluminum Company of America, pp. 34, 39 and 40 (1956).

OSCAR R. VERTIZ, *Primary Examiner.*

MAURICE A. BRINDISI, BENJAMIN HENKIN,
*Examiners.*

G. OZAKI, *Assistant Examiner.*